United States Patent
Gibbon et al.

(10) Patent No.: US 9,613,636 B2
(45) Date of Patent: Apr. 4, 2017

(54) SPEAKER ASSOCIATION WITH A VISUAL REPRESENTATION OF SPOKEN CONTENT

(71) Applicant: AT&T INTELLECTUAL PROPERTY I, L.P., Atlanta, GA (US)

(72) Inventors: David C. Gibbon, Lincroft, NJ (US); Andrea Basso, Turin (IT); Lee Begeja, Gillette, NJ (US); Sumit Kumar, Edison, NJ (US); Zhu Liu, Marlboro, NJ (US); Bernard S. Renger, New Providence, NJ (US); Behzad Shahraray, Holmdel, NJ (US); Eric Zavesky, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 52 days.

(21) Appl. No.: 14/703,413

(22) Filed: May 4, 2015

(65) Prior Publication Data

US 2015/0235654 A1    Aug. 20, 2015

Related U.S. Application Data

(63) Continuation of application No. 13/162,905, filed on Jun. 17, 2011, now Pat. No. 9,053,750.

(51) Int. Cl.
| | | |
|---|---|---|
| *G10L 21/10* | (2013.01) | |
| *G10L 15/26* | (2006.01) | |
| *G06F 17/30* | (2006.01) | |

(52) U.S. Cl.
CPC .............. *G10L 21/10* (2013.01); *G10L 15/26* (2013.01); *G06F 17/30867* (2013.01); *H04M 2201/40* (2013.01)

(58) Field of Classification Search
CPC ........... G10L 15/26; G10L 21/10; H04N 7/15; H04M 2201/40; G06F 17/30867
See application file for complete search history.

(56) References Cited

U.S. PATENT DOCUMENTS

| | | | |
|---|---|---|---|
| 6,100,882 A * | 8/2000 | Sharman | ............. H04L 12/1822 704/235 |
| 6,332,122 B1 | 12/2001 | Ortega et al. | |
| 6,421,645 B1 | 7/2002 | Beigi et al. | |
| 6,754,631 B1 * | 6/2004 | Din | ........................ G10L 17/00 704/270 |
| 6,810,116 B1 | 10/2004 | Sorensen et al. | |
| 6,816,468 B1 | 11/2004 | Cruickshank | |

(Continued)

*Primary Examiner* — Jialong He
(74) *Attorney, Agent, or Firm* — Greenblum & Bernstein, P.L.C.

(57) ABSTRACT

Speaker content generated in an audio conference is selectively visually represented. A profile for each audience member who listen to an audio conference is obtained. Speaker content from audio conference participants who speak in the audio conference is monitored. The speaker content from each of the audio conference participants is analyzed. Based on the analyzing and on the profiles for each of the plurality of audience members, visual representations of the speaker content to present to the audience members are identified. Visual representations of the speaker content are generated based on the analyzing. Different visual representations of the speaker content are presented to different audience members based on the analyzing and identifying.

19 Claims, 5 Drawing Sheets

(56) References Cited

U.S. PATENT DOCUMENTS

| | | | |
|---|---|---|---|
| 6,850,609 B1 | 2/2005 | Schrage | |
| 7,133,513 B1* | 11/2006 | Zhang | H04M 3/42221 379/202.01 |
| 7,603,273 B2 | 10/2009 | Poirier | |
| 7,698,173 B1* | 4/2010 | Burge | G06Q 30/02 705/26.5 |
| 7,831,427 B2 | 11/2010 | Potter et al. | |
| 7,844,454 B2 | 11/2010 | Coles et al. | |
| 8,001,261 B2 | 8/2011 | Katis et al. | |
| 8,731,919 B2* | 5/2014 | George | G10L 15/19 704/235 |
| 9,053,750 B2* | 6/2015 | Gibbon | G11B 27/28 |
| 2002/0069069 A1 | 6/2002 | Kanevsky et al. | |
| 2002/0091517 A1 | 7/2002 | Frank et al. | |
| 2002/0178002 A1 | 11/2002 | Boguraev et al. | |
| 2003/0004724 A1 | 1/2003 | Kahn et al. | |
| 2003/0115278 A1* | 6/2003 | Goker | G06F 17/30699 709/207 |
| 2003/0128820 A1 | 7/2003 | Hirschberg et al. | |
| 2004/0024598 A1 | 2/2004 | Srivastava et al. | |
| 2004/0070605 A1* | 4/2004 | Huang | G06F 17/30873 715/744 |
| 2004/0114746 A1* | 6/2004 | Caspi | H04L 12/1831 379/202.01 |
| 2006/0047701 A1* | 3/2006 | Maybury | G06F 17/30828 |
| 2006/0271369 A1* | 11/2006 | Poirier | G10L 15/26 704/276 |
| 2007/0079383 A1* | 4/2007 | Gopalakrishnan | G06F 17/30058 726/26 |
| 2007/0106724 A1 | 5/2007 | Gorti et al. | |
| 2007/0208567 A1 | 9/2007 | Amento et al. | |
| 2007/0271086 A1 | 11/2007 | Peters et al. | |
| 2008/0159503 A1 | 7/2008 | Helbling et al. | |
| 2009/0099845 A1 | 4/2009 | George | |
| 2009/0106676 A1 | 4/2009 | Brezina et al. | |
| 2009/0124272 A1* | 5/2009 | White | G10L 15/30 455/466 |
| 2009/0271438 A1 | 10/2009 | Agapi et al. | |
| 2009/0287685 A1 | 11/2009 | Charnock et al. | |
| 2009/0288007 A1 | 11/2009 | Leacock et al. | |
| 2009/0316872 A1* | 12/2009 | Wolf | H04M 3/567 379/202.01 |
| 2009/0326939 A1 | 12/2009 | Toner et al. | |
| 2010/0063815 A1 | 3/2010 | Cloran et al. | |
| 2010/0100826 A1* | 4/2010 | Hawthorne | G06Q 30/02 715/745 |
| 2010/0121638 A1 | 5/2010 | Pinson et al. | |
| 2010/0131866 A1 | 5/2010 | Nielsen et al. | |
| 2010/0138491 A1* | 6/2010 | Churchill | G06Q 50/00 709/204 |
| 2010/0158213 A1 | 6/2010 | Mikan et al. | |
| 2010/0228693 A1 | 9/2010 | Dawson et al. | |
| 2010/0268534 A1 | 10/2010 | Thambiratnam et al. | |
| 2011/0013756 A1 | 1/2011 | Davies et al. | |
| 2011/0040562 A1* | 2/2011 | Doyle | G11B 27/322 704/251 |
| 2011/0112833 A1 | 5/2011 | Frankel et al. | |
| 2011/0145258 A1 | 6/2011 | Kankainen | |
| 2011/0167078 A1 | 7/2011 | Benjamin et al. | |
| 2011/0185286 A1 | 7/2011 | Moyers et al. | |
| 2011/0231778 A1* | 9/2011 | Hoag | G06F 17/30867 715/745 |
| 2011/0270921 A1* | 11/2011 | Jones | G06F 3/0421 709/204 |
| 2011/0305326 A1* | 12/2011 | Poirier | G06Q 50/06 379/88.13 |
| 2012/0002001 A1 | 1/2012 | Prentice | |
| 2012/0143605 A1 | 6/2012 | Thorsen et al. | |
| 2012/0158775 A1* | 6/2012 | Choi | G06F 17/30997 707/769 |
| 2012/0166242 A1 | 6/2012 | Bentley et al. | |
| 2012/0174159 A1* | 7/2012 | Arte | H04N 21/2668 725/46 |
| 2012/0179465 A1 | 7/2012 | Cox et al. | |
| 2012/0191730 A1 | 7/2012 | Parikh et al. | |
| 2012/0321062 A1 | 12/2012 | Fitzsimmons et al. | |
| 2013/0031187 A1* | 1/2013 | Rajesh | H04M 3/567 709/206 |
| 2013/0058471 A1* | 3/2013 | Garcia | H04M 3/42221 379/202.01 |

* cited by examiner

SPEAKER ASSOCIATION WITH A VISUAL REPRESENTATION OF SPOKEN CONTENT

CROSS-REFERENCE TO RELATED APPLICATIONS

This is a continuation of pending U.S. application Ser. No. 13/162,905, filed on Jun. 17, 2011, the contents of which are expressly incorporated herein by reference in their entirety.

BACKGROUND

1. Field of the Disclosure

The present disclosure relates to audio conferences. More particularly, the present disclosure relates to visually representing relationships among speakers and speaker content.

2. Background Information

Recordings of audio conferences may be visually represented on visual control interfaces that allow an audience member to stop, pause, rewind or fast forward through an audio conference. Such visual control interfaces may be displayed on a video monitor for a computer that also has speakers or other equipment for outputting the audio recording of the audio conference. Examples of audio conferences include meetings at a single site, and conference calls or audio/video conferences or audio web meetings involving remote participants communicating over communications networks.

DETAILED DESCRIPTION

In view of the foregoing, the present disclosure, through one or more of its various aspects, embodiments and/or specific features or sub-components, is thus intended to bring out one or more of the advantages as specifically noted below.

Figure 1:
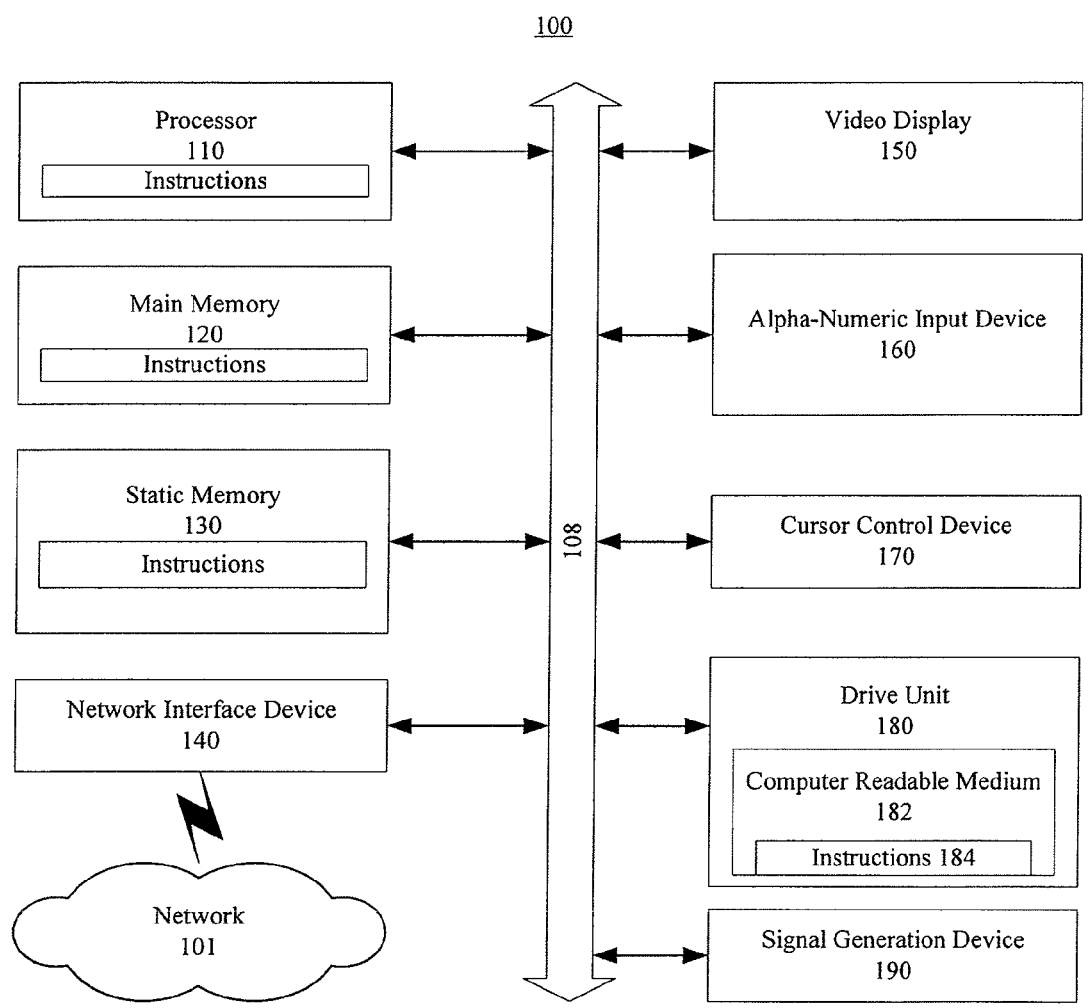
FIG. 1 shows an exemplary general computer system that includes a set of instructions for speaker association with a visual representation of spoken content described herein.

FIG. 1 is an illustrative embodiment of a general computer system that includes a set of instructions for performing processes for speaker association with a visual representation of spoken content as described herein. The general computer system is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices. For example, the computer system 100 may include or be included within any one or more of the computers, servers, bridges, devices, systems, or communication networks described herein.

In a networked deployment, the computer system may operate in the capacity of a server or as a client user computer in a server-client user network environment, or as a peer computer system in a peer-to-peer (or distributed) network environment. The computer system 100, or portions thereof, can also be implemented as or incorporated into various devices, such as a conference bridge, a monitoring server/recording server, an analysis server, a visualization server, a personal computer (PC), a tablet PC, a set-top box (STB), a personal digital assistant (PDA), a mobile device, a palmtop computer, a laptop computer, a desktop computer, a communication device, a wireless telephone, a personal trusted device, a web appliance, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an alpha-numeric input device 160, such as a keyboard, another input device (not shown), such as a remote control device having a wireless keypad, a keyboard, a microphone coupled to a speech recognition engine, a camera such as a video camera or still camera, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g., software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations, or combinations thereof.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

The present application describes mechanisms to visually represent relationships among speakers and speaker content in an audio conference. Audio conferences as described herein are to be construed broadly to include audible communications among humans that occur at a single site or over one or more communications networks, including conference calls and audio/video conferences and audio web meetings.

The audio conferences described herein are monitored for speaker audio content. Whether the audio content is recorded or not, the audio content is analyzed in order to generate visual representations of the audio content and relationships among speakers and the audio content. The mechanisms described in the present application are equally applicable to monitoring speaker image content or speaker video content of participants or presentations by participants in audio/video conferences and web meetings, using image recognition and analysis rather than only voice and speech recognition. Monitoring of images or video of presenters or presentations can be used to detect and recognize content similar to the mechanisms described herein for monitoring audible speaker content. As an example, slide images (or slide content) or handwritten or typed notes presented by a participant during a conference can be monitored for content so as to obtain visual representations of the slide images or handwritten or typed notes and relationships among speakers and the slide images or handwritten or typed notes. Alternatively, images or video of a participant during a conference can be monitored for content so as to obtain visual representations of the slide images or handwritten or typed notes and relationships among speakers and the slide images or handwritten or types notes.

An initial example of speaker association with a visual representation of spoken content uses a monitoring server/recording server to monitor a conference call, i.e., by connecting via a conference bridge in a communications network, or to monitor a meeting in a room. As speakers present remarks to the audience via the conference bridge or in the room, the monitoring server/recording server recognizes speakers with speaker identification software and speech content with speech recognition software. The monitoring server/recording server then selects recognized sets of one or more words from the speaker content and acts to generate visual representations of the speaker content and relationships among the speaker content and speakers in the audio conference. The visual representations are then reflective of the content in the audio conference, and not subjective to interpretations of those outside of the audio conference except inasmuch as analysis and visualization software used to generate the visual representations reflects underlying interpretations by the author of the analysis and visualization software.

In this and other embodiments, the monitoring server/recording server may attempt to generate visual representations of all recognized sets of one or more words for all speakers, or may attempt to generate visual representations of recognized sets of one or more words for one or more speakers that are deemed most worthy of visual representation. Similarly, even once generated, the visual representations may be offered wholesale for review, or may be selectively offered based on input from audience members or profiles of audience members and/or communications devices used by audience members. An analysis server may analyze input from audience members or profiles of audience members and/or audience member devices to determine which visual representations to present to the audience members.

In embodiments described herein, the visualizations are offered to audience members. The visualizations may be arranged as a tag cloud. Each tag cloud may contain either segments of content or tag summaries of the segments of content, as well as an indication that the content was presented by a particular speaker, and an indication of when the content was presented relative to when other content was presented by the same or other speakers.

Audience members may interact with the visualizations, to rearrange the visualizations and isolate content of one speaker or relating to a particular topic. In this way, an audience member may identify portions of an audio conference of the most interest to the audience member. The audience member may also review and interact with the visualizations without actually listening to the audio conference. The visualizations may also be presented in a manner such that an audience member rolling a cursor over a particular visualization results in the creation of selectable layered text. Selection of the layered text results in a display of the detailed content and/or context of the segment. Each segment visualization, topic visualization and audio conference visualization may also be selectively replayed upon selection for replay by an audience member.

The visualizations may be offered to the audience in forms and via networks different than the forms and networks in which and over which the audio conference is provided. For example, audience members listening to a corporate audio conference such as an earnings call via a telephony network may be presented with a real-time or near-real-time visualization of the audio conference over the Internet. The visualizations may also be made available to an audience member for interaction without the audio content of the audio conference.

Figure 2:
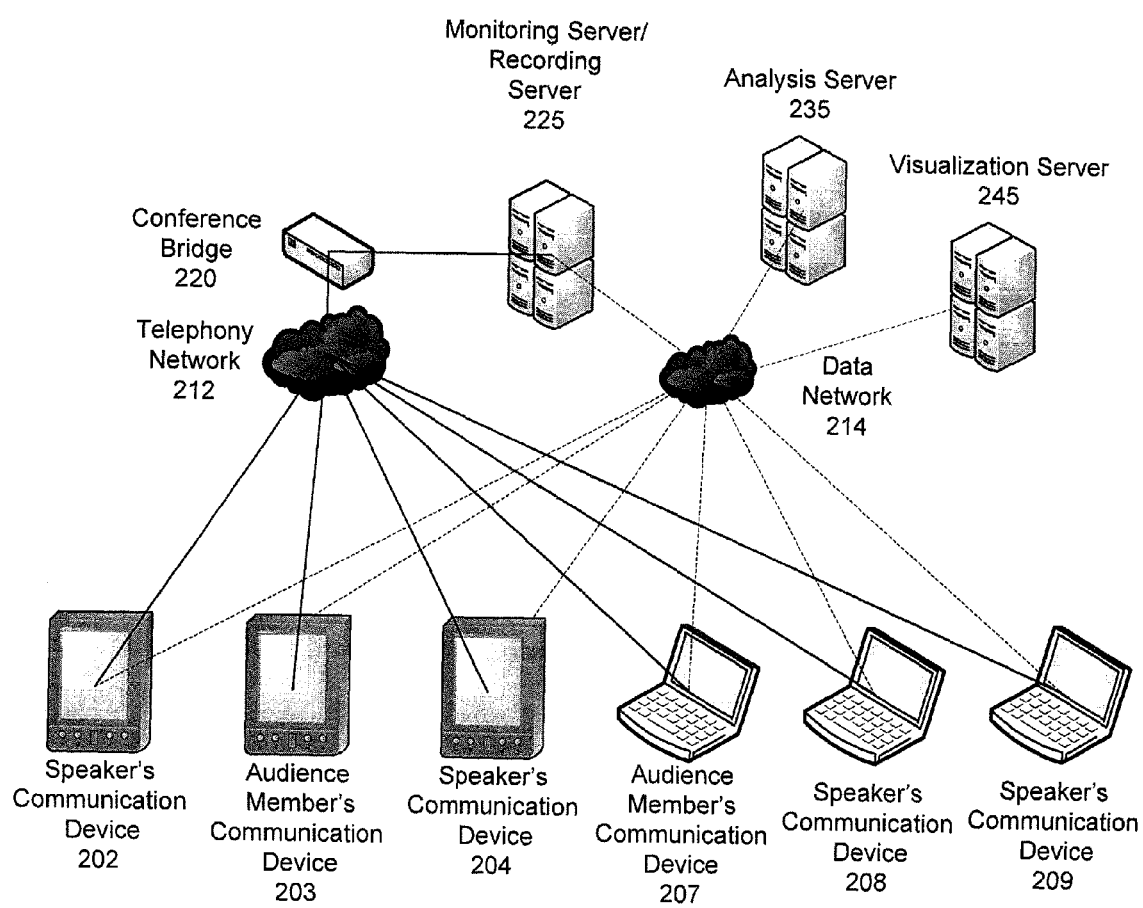
FIG. 2 shows an exemplary network for speaker association with a visual representation of spoken content described herein, according to an aspect of the present disclosure.

FIG. 2 shows an exemplary network for speaker association with a visual representation of spoken content. In FIG. 2, speaker's communication device 202 and speaker's communication device 204 are personal digital assistants, as is audience member's communication device 203. Audience member's communication device 207 is a laptop computer, as are speaker's communication device 208 and speaker's communication device 209. In FIG. 2, each of the speaker's communication devices 202, 204, 208 and 209 and audience member's communication device 203 and 207 is a dual use device that communicates via both a telephony network 212 and data network 214. However, in another embodiment, the devices 202-209 shown in FIG. 2 may also communicate using a single network such as the Internet or a cellular network, or a combination of any appropriate networks. In an embodiment, the devices 202-209 communicate via Voice over Internet Protocol (VoIP), by which voice communications are carried over a data channel. Speakers and audience members may also individually use more than one communications device, such as a telephone set to listen to an audio conference via a telephony network and a personal digital assistant to obtain visualizations of the content of the audio conference via the Internet. Multiple speakers and audience members may also share a single communications device to, for example, listen to and participate in an audio conference while also reviewing visualizations of the content of the audio conference.

The various speaker's communication devices 202, 204, 208 and 209 and audience member's communication devices 203, 207 participate in and/or listen to an audio conference bridged on a conference bridge 220 over a telephony network 212. The speaker content in the audio conference is monitored at the conference bridge 220 by a monitoring server/recording server 225. The monitoring server/recording server 225 monitors and records the audio conference. An analysis server 235 and a visualization server 245 communicate with the monitoring server/recording server 225 over a data network 214. The analysis server 235 recognizes speakers using speaker identification software and sets of words using speech recognition software.

Speakers can be identified in several ways. For example, if the speaker does not need to be specifically identified, speaker segmentation software can be used to distinguish different speakers. Speaker segmentation is used to distinguish between different speakers generically, whereas speaker identification specifically identifies different speakers. Speaker identification is useful, for example, when speakers are associated with individual profiles.

For speaker segmentation, users or a conference bridge administrator can label each different speaker with a label to effectively differentiate between the speakers. For speaker identification, the system can be trained to recognize each voice using dictation software. In either scenario, once the speech data is associated with an identity, speech models are built for each user to improve recognition of the words spoken by that user. That is, speaker identification software can be used for speaker identification, but this may assume that trained speech data from each user is already available so that each speaker can be identified. The more the users use the system, the more speech data will be correlated to different users using speaker identification or other methods. This increased speech data can be taken for each user and used to build improved speech models for each user so that the accuracy for speaker identification and speech recognition of the words improves.

As another alternative to speaker segmentation or speaker identification, the conference bridge may separately record each leg of a conference call, so that if only one person is dialing in for each leg, speakers can be differentiated by the legs they are speaking on. Alternatively, speakers can be differentiated by communications devices such as individual microphones they use.

The analysis server 235 segments the sets of words and correlates the sets of words with the individual speakers. As noted previously, speakers can be identified from their speech, from the conference legs on which they speak, or by communications devices they use to speak. Multiple communications devices used by a single speaker, such as a personal computer and telephone may be correlated to the speaker by login information on the devices or by the speaker logging in to the conference bridge using the devices. The analysis server 235 may also tag individual sets of words with descriptive tags of the substantive topic of the sets of words, so that visualizations of different sets of words are correlated together by topic. The analysis server 235 may also tag individual sets of words with the speakers who speak the sets of words, so that visualizations of different sets of words are correlated together by speaker.

The visualization server 245 generates the visualizations for audio conferences. The visualization server may initially generate sequential visualizations for each set of words in an audio conference. The visualizations may be broken up into fixed-length segments of the audio conference, or into variable-length segments defined by the beginning and end of a speaking segment for an individual speaker. The visualizations may include tags of descriptive keywords for the segment, as well as an identification of the speaker. Multiple sequential segments may also be identified by a single tag, such as the topic discussed in the multiple sequential segments.

Individual visualizations may be created for all recognized sets of words, but may also be created for only a subset of the recognized sets of words. For example, the analysis server 235 may select a subset of words from the speaker content using an algorithm. For example, the analysis server 235 may recognize that some speaker content is exchanges of courtesies or other speaker content not related to the primary topic(s) of an audio conference, and thereby designate such recognized speaker content as not warranting visualization. An algorithm may specify types of word sets and/or phrases that do not warrant visualization. The algorithm may classify each set of words into categories and assign weights to each set of words and certain sequences of words (n-grams) in order to identify those sets and sequences warranting visualization. Named entity detection software may classify sets of words and phrases into categories of information or events, such as acronyms, surnames, technical terms, place names, locations etc.

The analysis server 235 in FIG. 2 is an analysis engine that has access to the monitoring server/recording server 225 to analyze speaker content carried over the conference bridge 220. In another embodiment, a monitoring server/recording server 225 and an analysis server 235 with the characteristics described herein may be integrated together, or integrated in or as a component of the conference bridge 220. The analysis engine is used to identify which sets of words to visualize, and what information should be associated with a visualization of any particular set of words. The visualization server 245 determines how to visualize any particular set of words, and generates the visualizations.

The analysis by the analysis server 235 and the visualization by the visualization server 345 may be performed in real-time or near-real-time as an audio conference is taking place. Alternatively, the analysis and visualization may be performed later based on a recording of the audio conference. In either instance, the analysis and visualization use algorithms to determine data that reflects the content and context of speech in a segment, and may also reflect instructions by an audience member as to how the visualizations of segments should be presented.

The visualizations can be tailored based on analysis of sets of words, such as categorization of a set of words into predetermined categories. Specified sets of words may be pre-identified, such that visualizations for the sets of words already exist at the time the sets of words are detected in an audio conference. A list of specified sets of words and phrases may be maintained, so that any detection of a set of words on a list results in a creation of a visualization of the set of words.

The algorithm of an analysis engine can also determine which visualizations to present to audience members for review. For example, profiles of audience members or communication devices used by audience members may include information that an analysis engine can use to determine which visualizations of speaker content will be of use or interest to a particular audience member. Multiple profiles, such as an audience member's profile data from different social networking accounts, may be integrated or otherwise jointly used to determine which visualizations will be of use or interest to a particular audience member. A profile for an audience member may also include data reflective of previous use and interaction with visualizations of audio conferences by the audience member during prior audio conferences, as well as other types of activities performed by the audience member during prior audio conferences.

A single profile may be used for a group or sub-group of multiple audience members, such as when multiple audience members belong to a group that studies or is responsible for a particular topic. In this case, visualizations can be presented for selection to multiple audience members based on a common determination that the visualizations may be of interest to the multiple audience members.

Audience members can also customize their own profiles to indicate interests or speakers for which visualizations would be desired. For example, audience members can customize their own profiles to specify that they are interested in topical information of a particular type, such as batting averages for baseball players named in an audio conference, or biographies for business or political leaders named in an audio conference. Similarly, audience members can customize their own profiles to specify that they wish for visualizations to be restricted to only particular speakers or topics.

Audience members can customize their own profiles to indicate categories of information in speaker content that they do not want visualized. As an example, an audience member may indicate a lack of interest in politics or foul language, so that visualizations are not desired for sets of words categorized as political or foul. Based on input from one or more audience members, the analysis engine may therefore not even attempt to generate data for visualizations of certain sets of words identified as relating to particular categories of information, and only generate data for visualizations of sets of words not identified as relating to these particular categories of information. Therefore, the amount and type of visualizations presented to audience members can be tailored to an audience member's profile or a group profile so that the audience members are not overwhelmed or otherwise burdened with excessive information for review.

Profiles of communication devices can also be used so that types and amounts of visualizations presented to an audience member via any particular communication device are tailored to the profile of the communication device. For example, a visualization may be limited to one at a time for a relatively small cell phone screen, whereas multiple visualizations for multiple segments of speaker content and even multiple speakers may be presented on a personal digital assistant or on a personal computer. In this way, a profile of a communication device may dictate the limitations of the amounts and type of visualizations that are to be presented on the communication device for selection by an audience member.

In the embodiment of FIG. 2, the audio communications are provided in a conference call over a telephony network 212. However, in other embodiments, the audio communications are provided in an audio/video conference or audio web meeting and the communications network may be a data network such as the Internet. Additionally, the audio communications may be from a previous recording, such that speaker content and the visualizations may be provided together from a single source over a single network or on a single computer that plays the audio recording and visualizations from memory.

Figure 3:
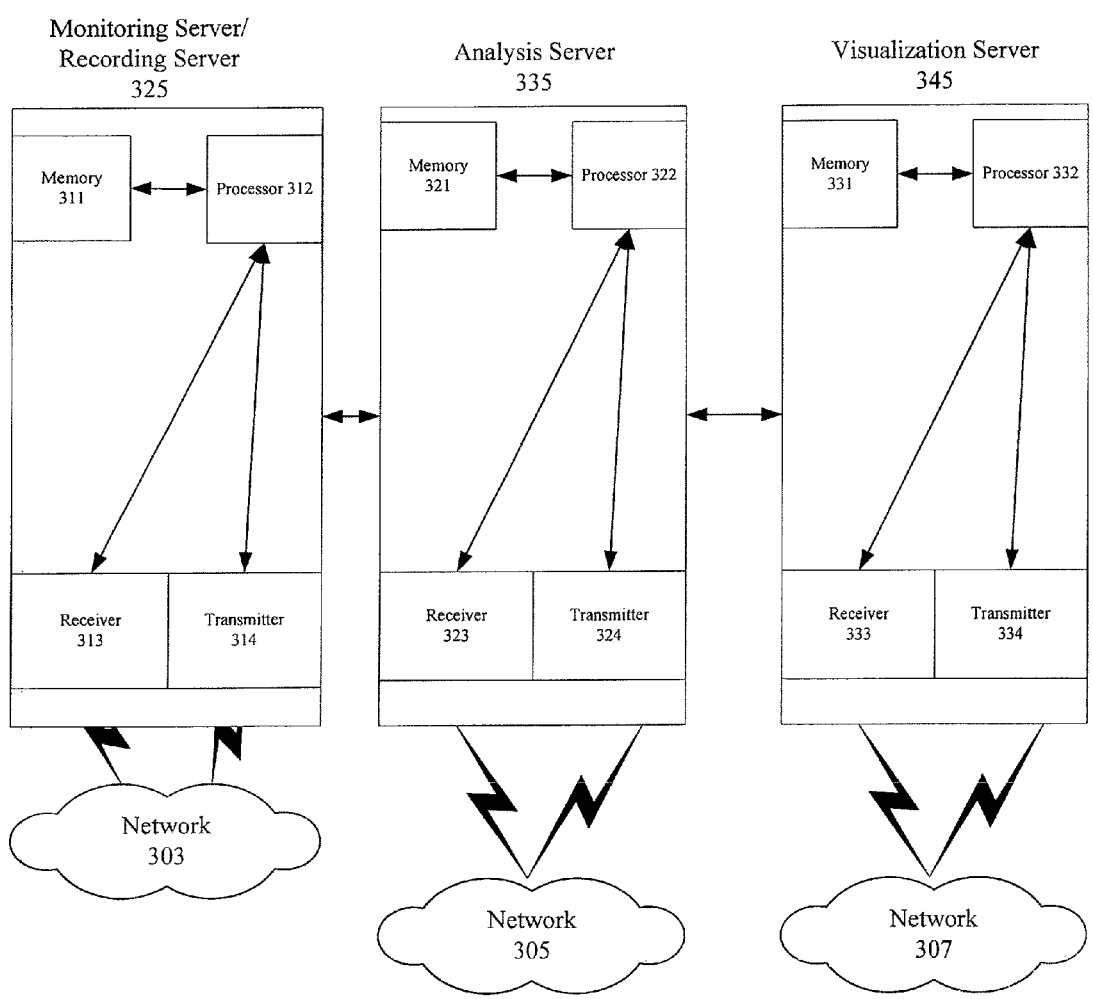
FIG. 3 shows an exemplary monitoring server/recording server, an exemplary analysis server, and an exemplary visualization server for speaker association with a visual representation of spoken content network, according to an aspect of the present disclosure.

FIG. 3 shows an exemplary monitoring server/recording server, an exemplary analysis server, and an exemplary visualization server for speaker association with a visual representation of spoken content network. In FIG. 3, monitoring server/recording server 325 includes a memory 311, a processor 312, a receiver 313 and a transmitter 314. The receiver 313 and transmitter 314 communicate over network 303. The processor 312 processes instructions and data from the receiver 313 and memory 311, and forwards instructions or data to transmitter 314 for transmission or to memory 311 for storage. In FIG. 3, analysis server 335 includes a memory 321, a processor 322, a receiver 323 and a transmitter 324. The receiver 323 and transmitter 324 communicate over network 305. The processor 322 processes instructions and data from the receiver 323 and memory 321, and forwards instructions or data to transmitter 324 for transmission or to memory 321 for storage. In FIG. 3, visualization server 345 includes a memory 331, a processor 332, a receiver 333 and a transmitter 334. The receiver 333 and transmitter 334 communicate over network 307. The processor 332 processes instructions and data from the receiver 333 and memory 331, and forwards instructions or data to transmitter 334 for transmission or to memory 331 for storage.

The monitoring server/recording server 325, analysis server 335 and visualization server 345 also communicate with each other in the embodiment of FIG. 3. The servers may communicate over a communications network, or two or all three of these servers may alternatively be implemented on the same physical computer.

As an example of an application for speaker association with a visual representation of spoken content, the monitoring server/recording server 325, analysis server 335 and visualization server 345 may be employed or engaged by the organization that organizes or sponsors the audio conference or employs one or more speakers in the audio conference. The speakers in an audio conference may be given an agenda of topics to discuss in an audio conference, along with a timeline for discussing each topic during the audio conference.

The monitoring server/recording server 325 then monitors the audio conference using speaker identification software and speech recognition software, and records the recognized speech. The analysis server 335 may be programmed only to recognize and analyze content from one or more specified speakers, or may be programmed to analyze content from all speakers in the audio conference. The analysis server 335 then recognizes each recognizable isolated word and the placement of each recognizable individual word in a phrase or sentence, and associates data with each segment of recognized speech. The visualization server 345 then generates visualizations for each segment of recognized speech, including identification of the speaker, the time of the segment, keywords that describe the content of the segment, and a topic that describes a generic topic of multiple sequential segments. A supervisor can then compare the visualizations from the visualization server 345 with the agenda and timeline set out in advance, and determine whether the speakers complied with the agenda and timeline. The supervisor may also determine that each topic in an agenda was covered in an audio conference. The segment visualizations may also include the data of a pre-set agenda. Further, the analysis server 345 may perform an automatic comparison of an agenda with the actual content of an audio-conference, and return data showing boundaries for the start and end of particular topics, boundaries for content that is off-topic, and speakers that did not present speech matching any expected agenda items.

Visualizations can also be analyzed across multiple audio conferences. For example, a social network may be formed between different participants in different audio conferences by determining that the different participants present similar speech content. Similarly, an audience member reviewing visualizations of an audio conference may receive suggested introductions to other audience members who filter the audio conference for similar criteria.

An analysis server 345 may also accept instructions from an audience member to determine a source and method to analyze an audio conference, such as an analysis to assign tags specified in a particular corporate database, or to assign tags from a particular textbook or technical dictionary. An audience member may also be able to select from different templates of icons or symbols or languages to use in analyzing speech in an audio conference and generating visualizations of speech segments.

Visualizations from the visualization server 345 are displayed on the speaker's communication devices 202, 204, 208, 209 and/or Audience Member's Communication Device 203 and 207 shown in FIG. 2. The speakers or audience members can input tags or commands to isolate only visualizations matching the input tags or commands. The speakers and audience members can also isolate one or more in a sequence of visualizations to review the data of each visualization.

As an example, using the monitoring server/recording server 325, analysis server 335 and visualization server 345, an Internet broadcast of a political audio conference such as a U.S. Senate hearing can be monitored, and a series of visualizations can be generated for each particular Senator or witness that speaks in the hearing. An audience member listening to the hearing may request isolated visualizations from only a particular timeframe in the hearing or only a particular speaker whose contributions are dispersed throughout the hearing, or only relating to a particular topic discussed during the hearing. As an example, a witness testifying to a Senate committee about oil prices may speak the phrase "peak oil", and the analysis server 335 may label a topic for data of a sequence of visualizations as "peak oil". The visualization server 345 then generates visualizations for the hearing, including the witness discussing "peak oil", and an audience member can isolate visualizations for segments in the audio conference that relate only to the topic of "peak oil".

Figure 4:
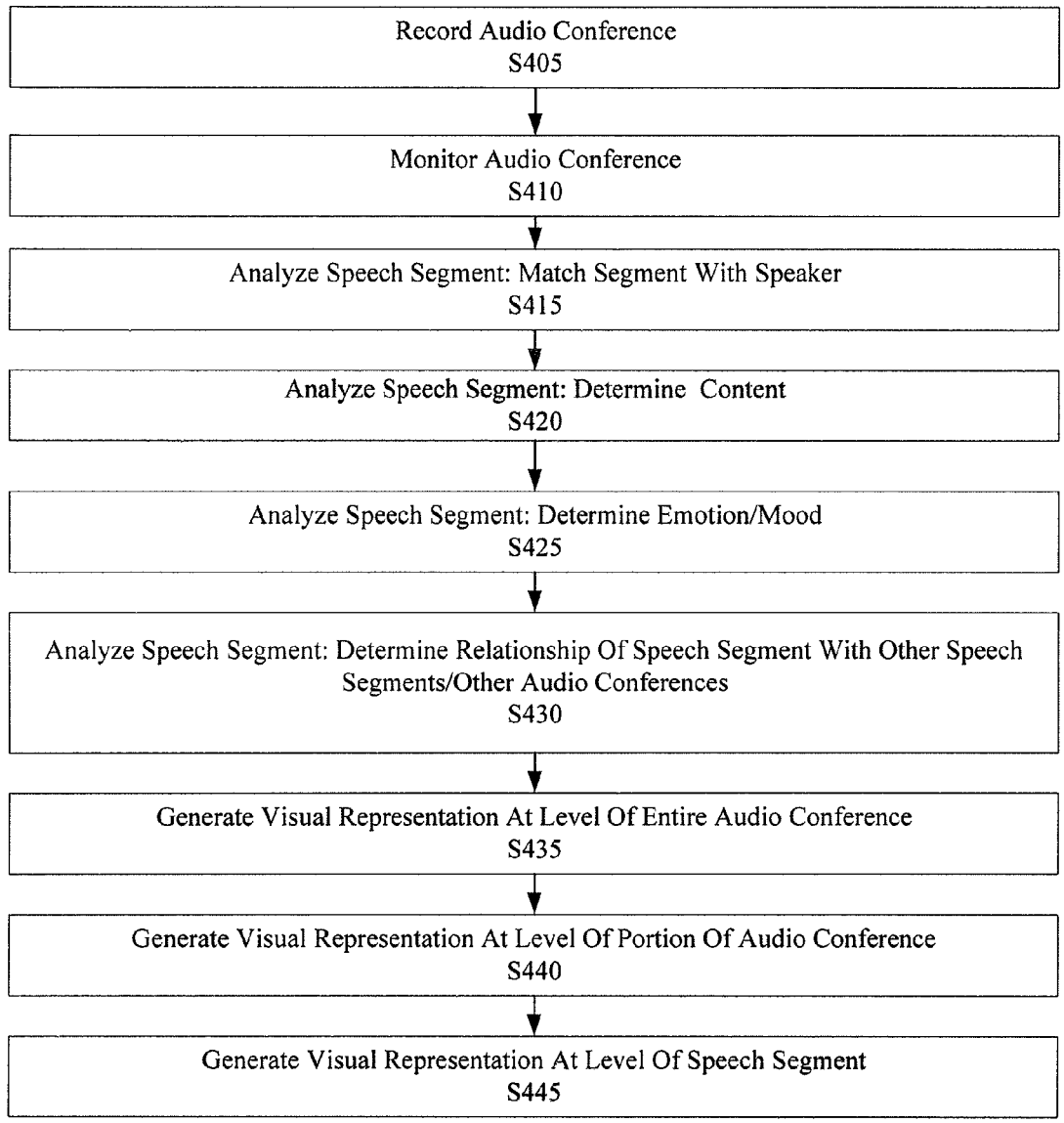
FIG. 4 shows an exemplary process for speaker association with a visual representation of spoken content described herein, according to an aspect of the present disclosure.

FIG. 4 shows an exemplary process for speaker association with a visual representation of spoken content. In the embodiment of FIG. 4, an audio conference is recorded at S405, and the recording of the audio conference is monitored at S410. This monitoring and recording in FIG. 4 is performed using, for example, the monitoring server/recording server 225 or 325 shown in FIGS. 2 and 3.

At S415, an analysis of a speech segment begins by matching the speech segment with a speaker. The matching at S415 may be performed using speaker identification, or may be performed using another mechanism such as by determining which speaker's microphone was in use at the time the speech segment was recorded during the audio conference.

At S420, the analysis of the speech segment continues by determining the content of the speech segment. For example, keywords in the speech segment may be recognized as belonging in a particular predetermined category of content, and the segment may be labeled with the predetermined category based on identification of the keyword in the content. An algorithm on, for example, the analysis servers 235 or 335 in FIGS. 2 and 3 categorize or otherwise label the content of each segment after speech recognition software recognizes the words of the speech in the content. Keywords assigned to a visualization for a speech segment may also be links to a uniform resource locator, such that a particular keyword may be selected by an audience member so that a website is brought up in a new window. Keywords may also be logically assigned by a neuro-linguistic algorithm, such as an algorithm that interprets use of terms "dollars" and "cost" together in a sentence or phrase as reflecting a comment about a "budget".

At S425, an emotion or mood of the speaker for the segment is determined. For example, an algorithm may recognize a tone of voice, or particular words or sounds, or a pace of speech, as being associated with a particular emotion or mood, and the data for the visualization for this segment may include this emotion or mood. In another embodiment, an overall mood of several sequential segments of an audio conference may be used to label the multiple sequential segments.

Conference material may be indexed by sets of words reflective of the content and context of each speaker, segment, topic and the overall audio conference. Indexed sets of words can be generated by analysis of the content and context, and the indexed sets of words may be made searchable by audience members so that audience members can quickly locate particular content.

At S430, a relationship of a speech segment with other speech segments or even other audio conferences is determined. For example, a speaker for a speech segment may be identified, and if the speech segment is labeled with an identification of the speaker, the identification will be the same as the other segments by the speaker. Additionally, the sequence of the segment in the audio conference is maintained, such that segments may be sequentially labeled in the order they are recorded.

At S435, a visual representation is generated for the entire audio conference. The visual representation of the entire audio conference may reflect multiple topics where each topic includes multiple segments by multiple different speakers. An individual visual representation is generated for each segment for each different speaker. At S440, a visual representation is generated at the level of a portion of an audio conference, such as for multiple sequential segments by a single speaker or for a particular topic. At S445, the visual representations are generated at the level of each speech segment.

Figure 5:
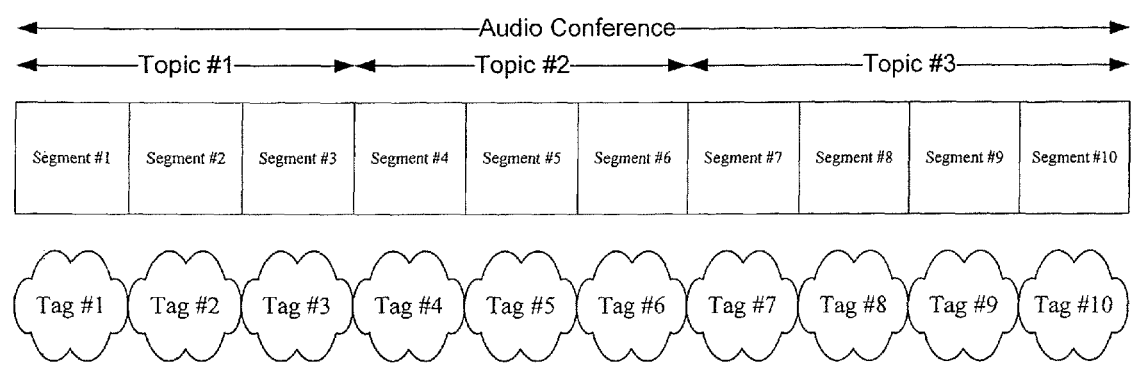
FIG. 5 shows an exemplary speaker association with a visual representation of spoken content, according to an aspect of the present disclosure.

FIG. 5 shows an exemplary speaker association with a visual representation of spoken content. As shown, the duration of the exemplary audio conference in FIG. 5 is delineated by arrows extending to the right and left of the term "Audio Conference" at the top of FIG. 5. The audio conference is broken up into three topics, Topic #1, Topic

2, and Topic #3. The duration of each topic in FIG. 5 is delineated by arrows extending to the right and left of the terms "Topic #1", "Topic #2" and "Topic #3" underneath "Audio Conference" in FIG. 5. The three topics are broken up into segments, #1 through #10. Topic #1 is broken up into Segment #1, Segment #2 and Segment #3; Topic #2 is broken up into Segment #4, Segment #5 and Segment #6; and Topic #3 is broken up into Segment #7, Segment #8, Segment #9 and Segment #10. The duration of each segment in FIG. 5 is delineated by vertical lines for the right and left edges of a box underneath the three topics in FIG. 5.

Data for each segment in FIG. 5 is delineated as a tag in a tag cloud underneath the segment. Though the data for each segment is not specified in the tags in FIG. 5, the data may include
- tags of the segment speaker's name
- tags of terms actually spoken in the segment
- tags of generic descriptors of content determined by analysis of the segment
- tags of a mood of the speaker determined by analysis
- tags of generic descriptors of content determined by analysis of the topic that includes the segment
- tags of a mood of one or more speakers for the topic determined by analysis
- tags of an identification of the placement order of the segment in the sequence of segments in the audio conference and/or in the sequence of segments in an individual topic
- tags of an identification of the start and stop times of the segment, relative to the beginning and end of the conference or in absolute standard times Of course, the data for each segment may also include any other information that can be gleaned from analysis of speech in the audio conference, or the timing of speech in the audio conference. The segments may also include visual informational indicators, such as colors that reflect an emotion of an individual speaker speaking the content in the segment or an overall mood determined from analysis of the emotions of several speakers on a topic. For example, segments in an angry exchange among several participants for a topic may be colored red in contrast to a light blue color for segments in which the speech reflects a calm emotion. In another embodiment, speech by individual speakers may be marked by the colors of segments, so that segments for each speaker, or the speakers that match a search by a listener, are shown in a color unique to that speaker in the context of the audio conference. In another embodiment, the color saturation could be used as a measure of the speaker energy level.

The size of a segment visualization or text in a segment's visualization may also be altered to reflect content or context of the segment. For example, a commonly used word such as "the" may appear in a smaller font than a less commonly used word such as "calculate". Thus, the frequency of use of a word, either in the audio conference or in everyday speech, may be reflected by size or font of the text. The relative infrequency of use of a word in an audio conference or in general everyday speech may also result in inclusion of the word in a visual representation, or in analysis that results in generation of tagwords reflective of the content of a segment or series of segments. In another embodiment, the font size can be determined from tf-idf weights (term frequency-inverse document frequency) which is a weight often used in information retrieval and text mining. This weight is a statistical measure of how important a word is to a document in a collection or corpus. The importance increases proportionally with the number of times a word appears in the document but is offset by the frequency of the word in the corpus. In another embodiment, the appearance of a word is changed according to how relevant the word is to an agenda of the meeting or conference in which the word is spoken.

Representative icons or other symbols may also be included in the data for a segment. For example, a segment that includes a question may include a question-mark symbol or a "Q", and a segment that includes an answer to a question may include an "A".

Segments may be shown as tag clouds, but each segment includes data beyond the speech spoken in a segment. As described above, segments may include data of a topic, a speaker, a sequence number, identifiable terminology, keywords, colors, symbols, or other data reflective of the content or context of the segment. Segments may also be shown in forms other than as tag clouds, such as in boxes, circles or other shapes.

Segments may initially be arranged in sequential order, but may be interactively and selectively rearranged by an audience member. For example, an input interface allows an audience member to search for particular terms or speakers or emotions or topics, so that only segments meeting the criteria in a search are displayed for the audience member. The appearance of segments may also be selected by an audience member, such as when an audience member wishes to see the progression of emotions in an audio conference.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

As described above, a method of visually representing speaker content generated in an audio conference is provided according to an aspect of the present disclosure. The method includes monitoring, using a computer with a tangible non-transitory processor and memory, speaker content from a plurality of audio conference participants. The method also includes analyzing the speaker content from each of the plurality of audio conference participants. A visual representation of speaker content for each of the plurality of audio conference participants is generated based on the analysis of the speaker content from each of the plurality of audio conference participants. The visual representation of speaker content is displayed. The visual representation of speaker content may be a tag cloud defined by a visual perimeter within which text and/or graphical information reflective of the content and context of a segment is provided.

According to still another aspect of the present disclosure, the analyzing includes searching for reference content using the speaker content, and selecting individual items of the reference content as representative tags for the speaker content. The reference content may include uniform resource locators, keywords determined to be representative of patterns of underlying content, symbols representative of underlying content, or any other information that can be retrieved and used in a visual representation of content in a segment in which a speaker speaks.

According to yet another aspect of the present disclosure, the analyzing includes determining an emotion of a speaker of speaker content. The emotion is determined using the audio of the speaker, and can be determined based on, for example, pitch, loudness, tone, pace of speech, or other characteristics of the voice or speech of the speaker or speakers in a segment or sequence of segments.

According to another aspect of the present disclosure, the analyzing includes associating a speaker with speaker content spoken by the speaker. The visual representation of speaker content is at least initially displayed in the sequence in which the speaker content was spoken in the audio conference. The association may then be shown by way of lines, arrows or other graphic illustrations.

According to still another aspect of the present disclosure, the visual representation of speaker content is selected for display by tags that characterize the speaker content. Tags may include keywords, icons, symbols, names, times, sequence numbers or other forms of searchable information that can be located in a later search by an audience member.

According to yet another aspect of the present disclosure, the visual representation is selectively displayed in accordance with criteria set by a user. Visual representations may be winnowed from visual representations for all segments of an audio conference to only those segments that meet a search by a user in accordance with criteria set by a user.

According to another aspect of the present disclosure, a display of the visual representation of speaker content is re-arranged in accordance with an instruction from a user. For example, a display of segments in sequential order in the audio conference may be re-arranged to a display in order of sequential order by one speaker. Visual representations of segments that do not meet an instruction may be removed or hidden from the display.

According to still another aspect of the present disclosure, the analyzing the speaker content includes generating metadata information for the speaker content. Such metadata may be generated from information gleaned from a speaker, or from analysis using an algorithm that analyzes the speaker content. For example, metadata may include a speaker's name, or searchable tagwords reflective of the content in a segment. Metadata may also include pointers to supplementary information, other meetings involving the speaker, references etc.

According to yet another aspect of the present disclosure, the visual representation includes visually linked visualized representations of speaker content for each of the plurality of audio conference participants.

According to another aspect of the present disclosure, the visually linked visualized representations are linked by a subject of the speaker content. The link may be a common keyword reflective of a common subject between different visualized representations, or may be graphic designations that designate a link between different visualized representations.

According to still another aspect of the present disclosure, the visually linked visualized representations are linked chronologically in the order of the speaker content visually represented by the visualized representations. The link may be a sequence number of the segments in sequence order as presented in an audio conference.

According to yet another aspect of the present disclosure, the visually linked visualized representations vary for different users viewing visual representations of the same audio conference. That is, representations may be personalized for different viewers, such as by adjusting fonts or text size or representation size or colors or arrangement of representations.

According to another aspect of the present disclosure, the visual representation also includes data descriptive of the speaker of the speaker content visually represented by the visualized representation.

According to still another aspect of the present disclosure, the visual representation includes a timeline of an agenda for the audio conference prepared prior to the audio conference. Such a timeline may be compared to the visual representations of segments in the audio conference to determine compliance with the timeline.

According to yet another aspect of the present disclosure, items in the visual representation are automatically selected for inclusion in the visual representation by an analysis engine. Such items may be selected in accordance with an algorithm that identifies keywords such as words that are least commonly used among a group of words.

According to still another aspect of the present disclosure, the visual representation includes a non-text visual graphic.

According to another aspect of the present disclosure, the visual representation includes multiple selectable layers of abstracted characterizations of the speaker content. Such layers may include topic, language, keywords, all details of the speech, or other manners of characterizing speaker content.

According to an aspect of the present disclosure, at least one non-transitory computer readable medium stores a set of executable instructions for visually representing speaker content generated in an audio conference. The executable instructions, when executed by a processor, cause a computer to monitor speaker content from a plurality of audio conference participants. When executed, the executable instructions also cause a computer to analyze the speaker content from each of the plurality of audio conference participants. A visual representation of speaker content is generated for each of the plurality of audio conference participants based on the analysis of the speaker content from each of the plurality of audio conference participants. The visual representation of speaker content is displayed.

According to an aspect of the present disclosure, at least one computer visually represents speaker content generated in an audio conference. The computer includes memory and a tangible non-transitory processor that stores a set of executable instructions for visually representing speaker content generated in an audio conference. An audio monitor monitors speaker content from a plurality of audio conference participants. The executable instructions, when processed by the processor, analyze the speaker content from each of the plurality of audio conference participants. The executable instructions, when executed by the processor, generate a visual representation of speaker content for each of the plurality of audio conference participants based on the analysis of the speaker content from each of the plurality of audio conference participants. The executable instructions, when executed by the processor, display the visual representation of speaker content.

While a computer-readable medium herein may be shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of selectively visually representing speaker content generated in an audio conference, the method comprising:
    obtaining a profile for each of a plurality of audience members who listen to an audio conference;
    monitoring, using a computer with a tangible processor and memory, speaker content from a plurality of audio conference participants who speak in the audio conference;
    analyzing the speaker content from each of the plurality of audio conference participants;
    determining a relation of the speaker content to a topic of discussion based on the analyzing;
    identifying, based on the analyzing and on the profiles of the plurality of audience members, visual representations of the speaker content to present to the audience members;
    generating visual representations of the speaker content based on the analyzing and determining; and
    at a specific point in time, different visual representations of the speaker content are presented to different audience members based on the analyzing and identifying,
    wherein the presented visual representations include selective visual representation of the speaker content related to the topic of discussion, such that speaker content that is not related to the topic of discussion is not visually represented,
    wherein the analyzing comprises classifying different sets of words and assigning different weights to the different sets of words, and
    wherein the identifying comprises selecting sets of words with highest assigned weights of the different sets of words.

2. The method of claim 1,
    wherein the visual representations are presented to the audience members in an order in which the speaker content is presented in the audio conference.

3. The method of claim 1,
    wherein the visual representations include an indication of relative timing at which the speaker content is presented in the audio conference.

4. The method of claim 1,
    wherein the visual representations of the speaker content presented to an audience member include visual representations of speaker content provided by one speaker but not another speaker, in accordance with a request by the audience member.

5. The method of claim 1,
    wherein the visual representations of the speaker content presented to an audience member are filtered using criteria provided by the audience member.

6. The method of claim 1,
    wherein the analyzing comprises searching for reference content using the speaker content, and
    wherein the identifying comprises selecting individual items of the reference content to selectively present to audience members.

7. The method of claim 1,
wherein the analyzing comprises associating a speaker with speaker content spoken by the speaker.

8. The method of claim 1,
wherein the analyzing the speaker content comprises generating metadata information for the speaker content.

9. The method of claim 1,
wherein the analyzing comprises identifying first select portions of the speaker content to visually represent and identifying second select portions of the speaker content not to visually represent.

10. The method of claim 1, further comprising:
assigning different identifies to different audio conference participants, and
associating speaker content with the different identifies using speaker segmentation software.

11. The method of claim 1,
wherein the presented visual representations are displayed chronologically in an order of the speaker content visually represented.

12. The method of claim 11,
wherein the visual representations that are displayed chronologically vary for different audience members for a same audio conference, based on the identifying.

13. The method of claim 1,
wherein the visual representations also include data descriptive of an audio conference participant who speaks the speaker content visually represented by the visual representation.

14. The method of claim 1, further comprising:
obtaining profile information of communications devices used by audience members,
wherein the generated visual representations of the speaker content are further generated based on the profile information of the communications devices.

15. The method of claim 1,
wherein speaker content is automatically selected in accordance with the analyzing for inclusion in the visual representations provided to an audience member.

16. The method of claim 1,
wherein the visual representation includes a non-text visual graphic.

17. The method of claim 1,
wherein the profile includes information provided by the audience member, and information about the audience member obtained externally from a source other than the audience member.

18. At least one non-transitory computer readable medium that stores a set of executable instructions for selectively visually representing speaker content generated in an audio conference, the executable instructions, when executed by a processor, causing a computer to perform a process comprising:
obtaining a profile for each of a plurality of audience members who listen to an audio conference;
monitoring, using a computer with a tangible processor and memory, speaker content from a plurality of audio conference participants who speak in the audio conference;
analyzing the speaker content from each of the plurality of audio conference participants;
determining a relation of the speaker content to a topic of discussion based on the analyzing;
identifying, based on the analyzing and on the profiles of the plurality of audience members, visual representations of the speaker content to present to the audience members;
generating visual representations of the speaker content based on the analyzing and determining; and
at a specific point in time, different visual representations of the speaker content are presented to different audience members based on the analyzing and identifying,
wherein the presented visual representations include selective visual representation of the speaker content related to the topic of discussion, such that speaker content that is not related to the topic of discussion is not visually represented,
wherein the analyzing comprises classifying different sets of words and assigning different weights to the different sets of words, and
wherein the identifying comprises selecting sets of words with highest assigned weights of the different sets of words.

19. At least one computer for selectively visually representing speaker content generated in an audio conference, comprising:
a memory;
a tangible processor that stores a set of executable instructions for selectively visually representing speaker content generated in an audio conference;
wherein the executable instructions, when processed by the processor, perform a process comprising:
obtaining a profile for each of a plurality of audience members who listen to an audio conference;
monitoring speaker content from a plurality of audio conference participants who speak in the audio conference;
analyzing the speaker content from each of the plurality of audio conference participants;
determining a relation of the speaker content to a topic of discussion based on the analyzing;
identifying, based on the analyzing and on the profiles of the plurality of audience members, visual representations of the speaker content to present to the audience members;
generating visual representations of the speaker content based on the analyzing and the determining; and
at a specific point in time, different visual representations of the speaker content are presented to different audience members based on the analyzing and identifying,
wherein the presented visual representations include selective visual representation of the speaker content related to the topic of discussion, such that speaker content that is not related to the topic of discussion is not visually represented,
wherein the analyzing comprises classifying different sets of words and assigning different weights to the different sets of words, and
wherein the identifying comprises selecting sets of words with highest assigned weights of the different sets of words.

* * * * *